O. F. MEYER & J. I. PAYNE.
TIRE ALARM.
APPLICATION FILED JAN. 31, 1918.
1,298,538.
Patented Mar. 25, 1919.
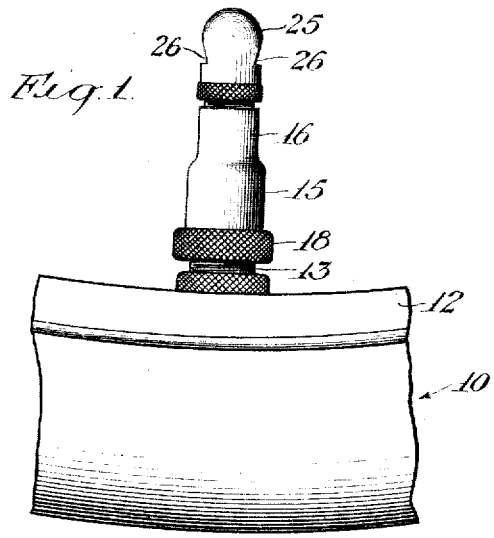
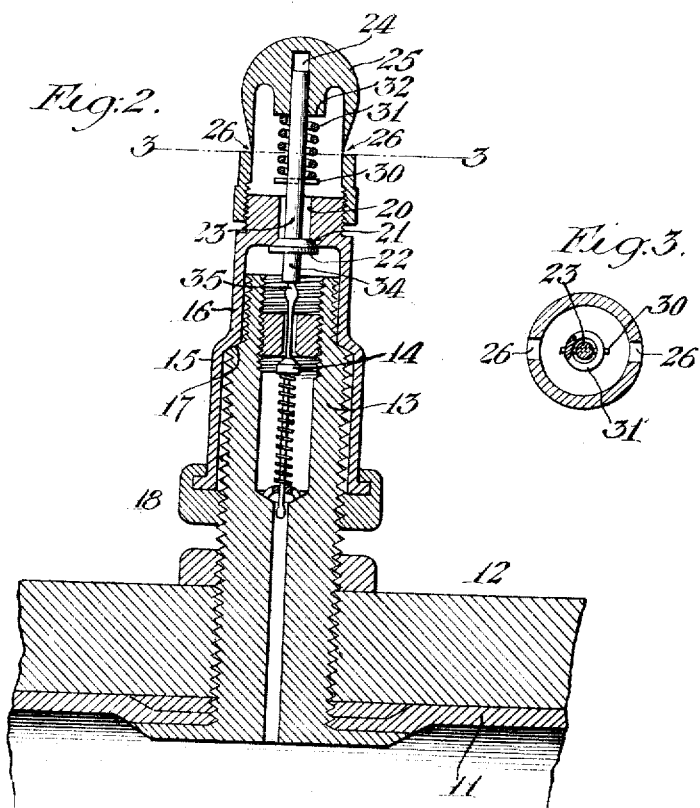
Inventors
Otto F. Meyer
James I. Payne
by Graham Harris
Attorneys

UNITED STATES PATENT OFFICE.

OTTO F. MEYER AND JAMES I. PAYNE, OF TAFT, CALIFORNIA.

TIRE-ALARM.

1,298,538.   Specification of Letters Patent.   Patented Mar. 25, 1919.

Application filed January 31, 1918. Serial No. 214,776.

*To all whom it may concern:*

Be it known that we, OTTO F. MEYER and JAMES I. PAYNE, both citizens of the United States, residing at Taft, in the county of Kern and State of California, have invented a new and useful Tire-Alarm, of which the following is a specification.

Our invention relates to a tire alarm, being more particularly a device adapted to be placed on the valve stem of the common form of pneumatic tire in use upon automobiles and the like.

The principal object of our invention is to produce a tire alarm of simple form and construction which may be placed upon the common valve stem of a pneumatic tire, and which may be readily adjusted to give an alarm of decrease of air pressure within the tire.

Referring to the drawings, which are for illustrative purposes only,

Figure 1 is a side elevation of the device embodying a form of our invention, such device being placed upon the valve stem.

Fig. 2 is an enlarged vertical section of the device shown in Fig. 1, and

Fig. 3 is a cross-sectional view on line 3—3 of Fig. 2.

10 designates a common form of pneumatic tire, 11 the inner casing, 12 the felly of the wheel, and 13 the valve stem having arranged therein a common form of air valve 14. 15 designates a cap having a reduced upper end 16 which is held against a seat 17 formed on the valve stem, being securely held thereon by means of a suitable union 18 threaded on the valve stem 13.

The upper end of the cap 15 is provided with a central passage 20, the lower end of which is formed with a valve seat 21 adapted to receive the alarm valve 22 which is formed on a stem 23 extending upwardly through the passage 20 and slidable freely in the central bore 24 of a whistle 25, the whistle 25 consisting of a cylindrical cap, the lower end of which is interiorly threaded upon the upper end of the cap 16.

The whistle 25 is provided with two openings 26 which are in open communication with the interior of the whistle and the passage 20 in the top of the cap 16.

30 designates a pin which extends through the stem 23 of the valve 22, against which pin is seated a coiled spring 31 surrounding the stem 23, the upper end of which spring 31 is seated against a circular shoulder portion 32 of the whistle.

When the tire alarm is placed upon the valve stem of a pneumatic tire, the parts assume the position shown in Figs. 1 and 2 of the drawings. In this position an extension 34 of the valve stem 23 engages the upper end of the stem 35 of the air valve 14, depressing such valve from its seat, as shown in Fig. 2, thereby permitting open communication from the interior of the tire to the valve 22 of the alarm, which pressure presses such valve against its seat 21 thereby preventing the flow of air from the interior of the valve to the whistle.

In the event of a puncture or a slow leak it should happen that the air pressure within the tire should decrease, the spring 31 would overcome the pressure of the air in the tire and would open the valve 22 thereby permitting air from the tire to pass through the passage 20 in the cap 16 to the whistle, and passing out of the openings 26, would cause an audible alarm thereby apprising the driver of the fact that the air pressure in the tire had fallen to a dangerous point. It is understood that the whistle may be adjusted to give an alarm at different pressures, which is accomplished by turning the whistle cap 16 thereby increasing or decreasing, as the case may be, the tension on the spring 31, it being also understood that the tension on the spring 31 regulates the pressure at which the secondary valve, that is the valve in the cap, opens against the pressure in the tire, the primary valve, that is the ordinary valve in the tire stem, being open at all times that the tire alarm is in place.

We claim as our invention:

1. In combination with a pneumatic tire valve, a cap adapted to fit over the stem of the tire valve, a valve in said cap arranged to hold said tire valve open when the valve in said cap is seated, a whistle on said cap, and elastic means for opening the valve in the cap upon decrease of air pressure in the tire.

2. In combination with a pneumatic tire valve, a removable cap on said valve stem having an opening in its upper end, a valve for closing said opening, means on said last named valve for unseating the tire valve when said valve in the cap is seated, elastic means for opening said valve in the cap, a whistle on said cap, and means for adjusting the position of said whistle to vary the tension on said elastic means.

3. In combination with a pneumatic tire valve, a removable cap seated on the tire stem, a whistle adjustably mounted on said cap, a secondary valve in said cap, means on said secondary valve adapted to open the tire valve when the secondary valve is seated, a stem on said secondary valve slidably extending into the whistle body, a pin in said stem, and a coiled spring on said stem between said pin and the whistle body.

In testimony whereof we have hereunto set our hands at Los Angeles, California, this 24th day of January, 1918.

OTTO F. MEYER.
JAMES I. PAYNE.